(No Model.) 2 Sheets—Sheet 1.
W. RAAB.
AUTOMATIC CAR BRAKE.
No. 451,435. Patented Apr. 28, 1891.
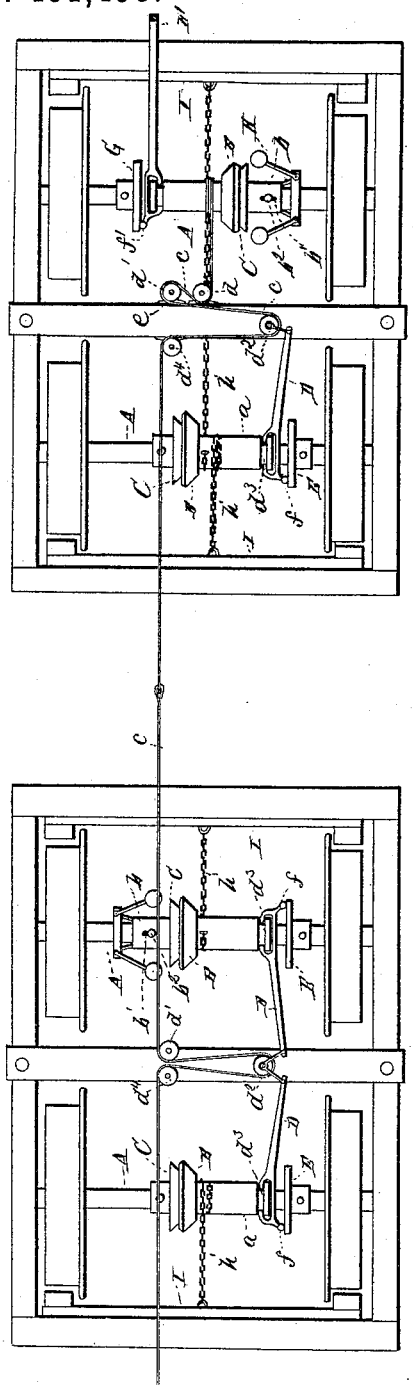
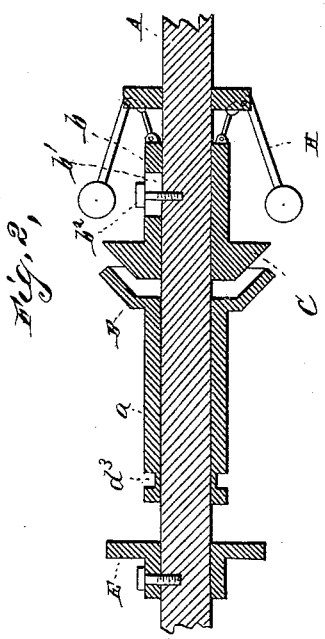
Witnesses
Inventor
Wᵐ Raab.
by E. W. Anderson,
his Attorney (No Model.)  2 Sheets—Sheet 2.
W. RAAB.
AUTOMATIC CAR BRAKE.
No. 451,435. Patented Apr. 28, 1891.
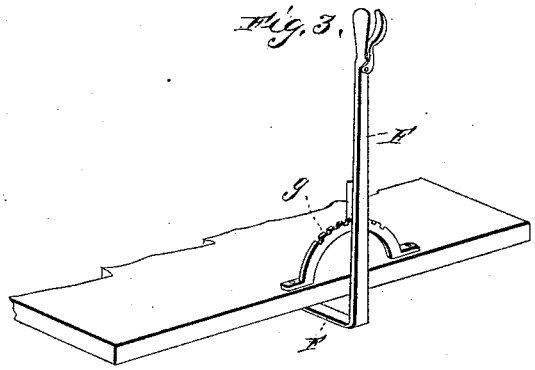
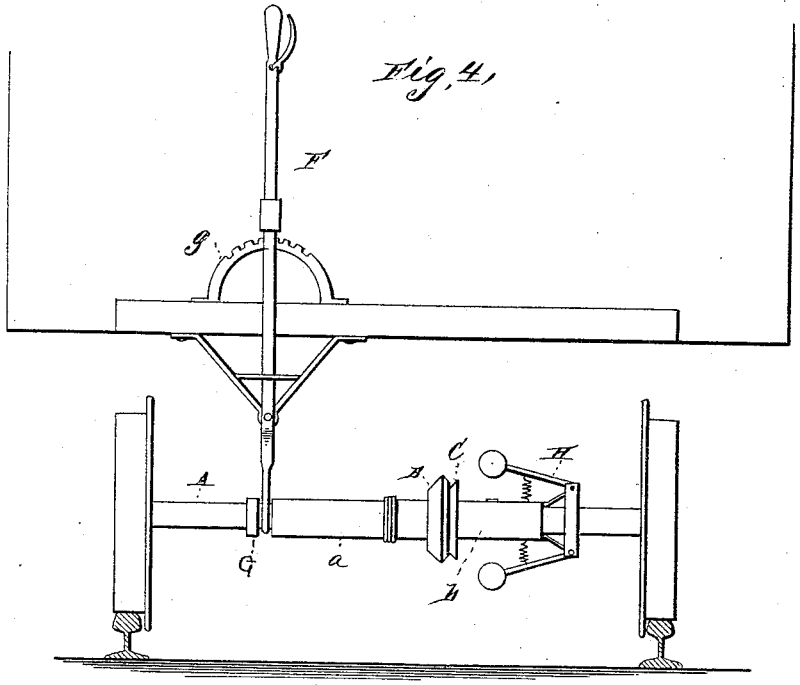

UNITED STATES PATENT OFFICE.

WILLIAM RAAB, OF CEDAR FALLS, IOWA, ASSIGNOR OF ONE-HALF TO WILLIAM R. GRAHAM, OF SAME PLACE.

AUTOMATIC CAR-BRAKE.

SPECIFICATION forming part of Letters Patent No. 451,435, dated April 28, 1891.

Application filed September 17, 1890. Serial No. 365,255. (No model.)

*To all whom it may concern:*

Be it known that I, WILLIAM RAAB, a citizen of the United States, and a resident of Cedar Falls, in the county of Black Hawk and State of Iowa, have invented certain new and useful Improvements in Automatic Car-Brakes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a bottom plan view. Fig. 2 is a sectional detail. Figs. 3 and 4 are detail views.

This invention relates to certain improvements in car-brakes; and it consists in the novel construction and combination of parts hereinafter disclosed.

In carrying out my invention I arrange so as to slide on each axle A of a car a beveled frictional flanged or rimmed wheel B in any suitable way. It may be by casting the wheel with a sleeve $a$, having its bore fitting the axle loosely. Also on each axle I arrange a correspondingly-beveled frictional wheel C, adapted in diameter to fit within and have frictional contact with the rim or flange of the wheel B, and having a sleeve or drum $b$, provided with a slot $b'$, receiving a set-screw $b^2$, engaging the axle, said sleeve or windlass having connected to it a rope or cable $c$. The rope or cable $c$ passes from the sleeve or drum $a$ around a pulley $d$ and in a reverse direction around a second pulley $d'$, both pulleys being suitably hung upon a board or support $e$ on the under side of the car. Said rope or cable is next passed around a pulley $d^2$, carried by a lever D, forked in a circular groove or recess $d^3$ in the sleeve or drum $a$ of the frictional flanged or rimmed beveled wheel B of the opposite axle. The rope or cable is passed around a fourth pulley $d^4$, suitably hung on the same truck, and around a similar arrangement of pulleys and levers on the succeeding cars of the train.

The lever D has at the outer end of its short arm a ball or roller $f$, engaging or bearing against a disk E, secured upon the latter-referred-to axle.

F is the hand or brake lever, fitting in a circular groove or recess and astride of the sleeve $a$ of the other axle A, and having its lower end also provided with a roller or ball $f'$, likewise engaging or bearing against a disk G, secured upon said axle.

The lever F is adapted, as usual, to be adjusted and held by means of a rack $g$, secured to the car-frame, and a spring-pressed detent or pawl engaging said rack.

The sleeve $b$ of one wheel C is provided with centrifugally-acting governor-arms H to automatically regulate the application of the brakes, especially in descending a downgrade, more fully set forth further on.

I I are the brake or shoe carrying bars, connected by chains or cables $h$ $h$ to the sleeve or drum $a$ of the wheel B, actuated by the lever D, as distinguished from the one operated by the hand or brake lever F.

It is obvious that by properly actuating the hand-lever F the wheel B will be shifted in contact or engagement with the wheel C, and that through frictional contact of the same the sleeve or drum $a$ of the wheel B will be rotated, and consequently wind the rope or cable $c$ thereon, thus tightening said rope or cable and actuating the lever D in turn, throwing its respective sleeve or drum in action, effecting the winding of the chains or cables $h$, thus drawing upon and moving inward the bars I I and applying their shoes or brakes to the car-wheels. It will also be seen that the governor or centrifugally-acting arms H, being set at a predetermined speed of the car axles or wheels, they will, in case of a greater speed thereof, as would occur in going downgrade, be thrown outward or extended and move the wheel C in contact with the wheel B and wind the cable or rope on the sleeve or drum $a$ of the wheel B, thus putting on the brakes with greater or less pressure. As the speed is checked, the arms H will move inward, disengaging the wheels B and allowing the release of the brakes from the car-wheels; but upon the speed again increasing the aforesaid action of the governor-arms will be repeated, and so on until the cars have reached a level.

In the modification as disclosed in Fig. 4 the hand or brake lever is pivoted intermediately of its point of engagement with the wheel-sleeve and with the retaining-rack.

Having thus described my invention, what I claim as new, and desire to secure by Letters Patent, is —

1. The car-brake having the sliding flanged or rimmed beveled wheels and the corresponding beveled wheels adapted to have frictional contact or engagement with the flanged wheels, said wheels being sleeved upon the car-axle, the cable or rope connected to the sleeve of one of said wheels, the lever forked in a circular groove or recess in the sleeve of one of the wheels of the opposite axle, said lever carrying a pulley operated by said rope or cable, and the brake-bars having connection with one of the said sleeves, substantially as set forth.

2. The car-brake having the engaging frictional wheels, their sleeves, the rope or cable connected to one of the said sleeves, the lever D, forked in a circular groove or recess in the sleeve of one of the wheels on the opposite axle and carrying a pulley actuated by said rope or cable, and the centrifugally-acting governor-arms carried by one of the said sleeves and adapted to automatically regulate the frictional contact of the said wheels, substantially as described.

3. The car-brake having the engaging frictional wheels and the intermediate appliances for actuating the brake-bars, in combination with the hand or brake lever engaging a sleeve of one of said wheels and its retaining-rack, substantially as set forth.

4. The car-brake having the engaging frictional wheels and the intermediate appliances for actuating brake-bars, in combination with the hand or brake lever forked upon the sleeve of one of said wheels and having its lower end provided with a roller or ball engaging a disk on the axle bearing said sleeve, and the retaining-rack for said lever, substantially as set forth.

In testimony whereof I affix my signature in presence of two witnesses.

WILLIAM RAAB.

Witnesses:
 DANFEAR KNAPP,
 S. N. PIERCE.